United States Patent Office 2,731,454
Patented Jan. 17, 1956

2,731,454

POLYMER-BORIC ANHYDRIDE REACTION PRODUCTS

James T. Edmonds, Jr., Bartlesville, Okla., assignor to Phillips Petroleum Company, a corporation of Delaware No Drawing. Application April 13, 1953,
Serial No. 348,589

14 Claims. (Cl. 260—94.7)

This invention relates to novel products prepared by treating polymeric materials with boric anhydride. In a further aspect this invention relates to products prepared from hydroxylated liquid and rubbery polymers and copolymers of conjugated diolefins, and from hydroxylated natural rubber. In a further aspect this invention relates to products prepared by heating boric anhydride with hydroxylated natural rubber, liquid hydroxylated polymers and copolymers of conjugated diolefins, and rubbery hydroxylated polymers and copolymers of conjugated diolefins. In a further aspect this invention relates to novel products ranging in properties from rubbery to hard, infusible resins, prepared by treating the liquid hydroxylated polybutadiene with boric anhydride. A further aspect of this invention relates to a method for the production of these novel products.

Each of the following objects is obtained by at least one of the aspects of this invention.

An object of this invention is to provide new products which range in properties from rubbery materials to hard resins. A further object of this invention is to provide new materials which are the products prepared by heating boric anhydride and rubbery materials. A further object of this invention is to provide a method for the production of these products. A further object of this invention is to provide a method for the production of novel products by treating hydroxylated liquid polybutadiene with boric anhydride.

Other objects and advantages of this invention will be apparent to one skilled in the art upon reading this specification.

I have discovered a new series of products and a novel method for their production. These new products result when hydroxylated liquid and rubbery polymers and copolymers of conjugated diolefins or hydroxylated natural rubber are treated with boric anhydride ($B_2O_3$). The products of the present invention range from rubbery through factice-like materials to hard, difficulty fusible resinous materials. They are characterized by being substantially insoluble in, and unaffected by, hot and cold water, dilute aqueous alkalies and dilute aqueous inorganic acids, and are essentially insoluble in ethanol, acetone, benzene, and chloroform.

The rubbery and factice-like products of this invention are useful as additives for elastomers and resins, as components of coating compositions, as components for sealing compositions and the like. The hard, difficultly fusible materials are useful as molding powders, as binders for solid materials, as components for coating compositions, as components for sealing compositions and the like.

Where the term "rubber" is used in this specification without a qualifying adjective, the term includes both natural and synthetic rubber.

Starting materials applicable for use in the present invention include liquid and rubbery hydroxylated polymers and copolymers of conjugated dienes, and hydroxylated natural rubber. The copolymers of conjugated dienes may be copolymers of two or more conjugated dienes or copolymers of conjugated dienes with other monomers polymerizable therewith containing a $CH_2=C<$ group. Examples of these materials polymerizable with the conjugated diene are ethyl acrylate, styrene, acrylonitrile and the like.

The production of liquid and rubbery polymers and copolymers may be carried out by mass or emulsion polymerization. One suitable method for the preparation of these liquid polymers is disclosed in U. S. Patent 2,469,132 by W. A. Schulze and W. W. Crouch. The liquid and rubbery polymers are then hydroxylated by known means, such as with hydrogen peroxide in the presence of formic acid. A preferred method for the production of liquid hydroxylated polybutadiene is described in copending application Serial No. 204,062, filed January 2, 1951, by J. C. Hillyer and L. O. Edmonds. Such liquid hydroxylated polybutadienes are characterided by their appearance as pale straw-colored, viscous liquids. The method therein described comprises catalytically hydroxylating these materials with hydrogen peroxide in the presence of formic acid or the lower alkyl esters thereof. Hydroxylated natural rubbers which are applicable for use in the present invention are rubbery materials.

The products are prepared by admixing the hydroxylated synthetic polymer or hydroxylated natural rubber with a suitable amount of boric anhydride and heating in the range from 80 to 200° C., preferably from 90 to 150° C. for a period of from 0.5 to 20 hours, preferably from 1 to 6 hours. The amount of boric anhydride employed is equivalent to 0.05 to 20 per cent by weight of the hydroxylated starting material and preferably from 1 to 15 per cent by weight.

Various methods are used in producing these materials, and the particular method employed depends somewhat on the physical state of the hydroxylated polymer. One embodiment, frequently used when the starting material is liquid, is to mix the boric anhydride with the starting material and then to heat the resultant mixture at a temperature and for a time within the above limits. When employing rubbery starting materials, admixture of boric anhydride with said materials can suitably be effected by milling the two materials together, and then placing the milled mixture in a suitable mold or in an oven and heating until the desired products are obtained.

Another embodiment is to conduct the boric anhydride treatment with the hydroxylated starting material dissolved in a suitable inert solvent. In this operation, solvents which are inert to boric anhydride are employed, suitable solvents including chloroform, carbon tetrachloride, toluene, acetone, and the like.

Although I generally employ atmospheric pressure for carrying out the present process, pressures above and below atmospheric can also be used. Pressures above atmospheric are preferably employed when the reaction is carried out in a solvent in order to avoid loss of said solvent at the reaction temperature.

The nature of the products prepared by the process of this invention is dependent upon the extent to which the boric anhydride treatment is carried. For example, when employing liquid hydroxylated starting materials, such as liquid hydroxylated polybutadiene, rubbery to factice-like products are prepared by using up to about 10 weight per cent of boric anhydride based upon the hydroxylated starting material, a reaction temperature of about 100 to 120° C., and a heating period in the range of 1 to 2 hours. Using larger amounts of boric anhydride and/or longer heating periods, solid resinous materials are produced. For example, using approximately 10 to 15 weight per cent of boric anhydride, a temperature in the range of 100 to 120° C. or higher, and a heating period of at least 5 hours gives a solid, difficultly fusible resinous product. Following this treatment the boric anhydride can be recovered from the products in the form of boric acid by extracting the products with hot water. This extraction does not affect the physical properties of the product. Although not necessary, in some instances it is desirable to recover the boric anhydride.

I have found that the most preferable method of recovering the boric anhydride is to disperse the polymer containing the boric anhydride in a solvent. The result is not a true solution but there occurs a softening action brought about by the solvent which permits the dispersion of the polymer. Any solvent which exerts this softening action and which is not affected by the materials present, can be used. Chlorinated low molecular weight hydrocarbons are preferred such as dichloromethane, chloroform, carbon tetrachloride, tetrachloroethylene, and the like. Aromatics such as benzene, toluene and xylene as well as the proprietary solvents "Cellosolve" and "Carbitol" was also suitable. Other liquid hydrocarbons, such as the paraffins, can be used, but these materials do not exert as great a softening action and it is necessary to use larger amounts to accomplish the same result. Following dispersion of the polymer in the solvent, the dispersion is contacted with a large amount of water, the boric anhydride being transferred into the water phase. Both of these later steps, contacting with the hydrocarbon solvent and the water, can be carried out at room temperature, but it is preferable to use higher temperatures in order to accelerate the process.

Following extraction of the boric anhydride there is no noticeable change in the polymeric product. This leads me to believe that the boric anhydride exerts a catalytic action bringing about cross linking in the polymer. Heating such a polymer in the absence of boric anhydride does not result in a change in the product, a liquid hydroxypolybutadiene remaining a liquid following such heating. Thus the product obtained after heating with boric anhydride is not predominantly an ester of boric acid.

The following examples represent certain preferred methods of operation of this invention but should be considered in an illustrative sense and not to limit the present invention to the specific times, temperatures, and ratios of reactants employed therein.

EXAMPLE I

*Preparation of hydroxylated polybutadiene*

Fifteen pounds of sodium catalyzed liquid polybutadiene having a viscosity in the range from 400 to 500 Saybolt Furol seconds, was dissolved in 120 pounds of chloroform and charged to a glass lined steel autoclave. 9.42 pounds of 33.4 weight per cent hydrogen peroxide, 6.30 pounds of water and 4.26 pounds of formic acid were also charged. The ratio of reactants charged provided 3 $C_4$ units in the polybutadiene per mol of hydrogen peroxide (also per mol of formic acid since the molecular ratio of hydrogen peroxide to formic acid was equal to one). Each $C_4$ unit represents a molecule of butadiene. These polymerize, by means of 1,4 and 1,2 addition, to form the polybutadiene.

After charging, the temperature of the reaction mixture was raised to 120° F. at atmospheric pressure and maintained at that level for 12 hours. The mixture was stirred to provide complete contacting. At the end of the 12 hour reaction period, 5 gallons of water were added and the chloroform-hydroxy-polybutadiene solution was recovered by decantation. Seven grams of tertbutylcatechol in chloroform was added to said solution with stirring as antioxidant. Chloroform was then removed from the product by distillation under vacuum.

The product had a carbon and hydrogen content by analysis totaling 87.7 per cent by weight, and an oxygen content by difference of 12.3 per cent.

EXAMPLE II 15.77 grams of the liquid hydroxylated polybutadiene prepared in the manner described in Example I and 0.3 gram of boric anhydride was heated at 120° C. for 2 hours. A light yellow, rubbery material was formed.

EXAMPLE III 20.56 grams of the liquid hydroxylated polybutadiene prepared in the manner described in Example I and 2.3 grams of boric anhydride was heated at 120° C. for 2 hours. The product was a light yellow solid resembling factice.

Samples of this product were treated with the following reagents or solvents for 5 days. Results are recorded below:

| Reagent or Solvent | Effect |
| --- | --- |
| 10% aqueous KOH | No visible effect. |
| 10% aqueous $H_2SO_4$ | Do. |
| Ethanol | Very slightly soluble. |
| Acetone | Do. |
| Benzene | Do. |
| Chloroform [1] | Do. |

[1] The chloroform insoluble portion was a granular solid which was insoluble in cold and hot water.

EXAMPLE IV 40.0 grams of the liquid hydroxylated polybutadiene prepared in the manner described in Example I and 4.0 grams of boric anhydride was heated at 100° C. for 2 hours. A solid material resembling factice was formed.

42.08 grams of this solid material was broken into pieces of approximately 6 to 8 mesh and boiled in 200 ml. of water for 8 hours. The product remained solid and did not change in appearance. The water employed in the extraction was evaporated and the residue was dried at 120° C. for 2 hours. This dry residue weighed 3.81 grams and was identified as boric acid. This amount of boric acid represented 56 weight per cent of the boric anhydride added at the beginning of the run.

The following examples illustrate that compositions prepared in the manner of the present invention can be employed as binders for solid materials.

EXAMPLE V 15 grams of liquid hydroxylated polybutadiene prepared in the manner described in Example I, 1.0 gram of boric anhydride and 37 grams of powdered potassium chloride were admixed and heated at 100° C. for 5 hours. The product was a hard, solid material.

EXAMPLE VI 15 grams of liquid polybutadiene prepared in the manner described in Example I, 3 grams of boric anhydride and 37 grams of potassium chloride were admixed and heated at 100° C. for 17 hours. The product was a hard, solid material.

EXAMPLE VII 15 grams of liquid hydroxylated polybutadiene prepared in the manner described in Example I, 0.5 gram of boric anhydride and 37 grams of powdered potassium chloride were admixed and heated at 100° C. for 5 hours. This product was a hard material, but softer than the product of Examples V and VI and somewhat flexible.

EXAMPLE VIII

In order to demonstrate that the product prepared by treating the polymer with boric anhydride is not merely the result of heating with a solid material, a run was made in which 15 grams of liquid hydroxylated polybutadiene and 37 grams of powdered potassium chloride were heated at 100° C. for 5 hours. There appeared to be no change in the liquid hydroxylated polybutadiene and the potassium chloride settled out of the mixture after cooling.

EXAMPLE IX

*Preparation of hydroxylated polybutadiene*

270 grams of sodium catalyzed liquid polybutadiene, 2215 grams of chloroform, 77.0 grams of formic acid and 205.0 grams of 27.6 weight per cent hydrogen peroxide was charged to a reactor and heated at 50–52° C. for 29 hours with stirring. At the end of the reaction period the reaction mixture was washed with an equal volume of water. 500 ml. of methanol was then admixed with the washed reaction mixture which was then heated to 90° C. (195° F.) to remove chloroform, methanol and catalyst as methyl formate. A second addition of 500 ml. of methanol was made and distilled from the polymer, the last traces being removed under vacuum. The temperature was maintained at 195° F. during the distillation.

A yield of 289 grams of liquid hydroxylated polybutadiene was obtained. This product had a carbon content by analysis of 77.2 weight per cent, a hydrogen content by analysis of 10.0 weight per cent and an oxygen content by difference of 12.8 weight per cent.

EXAMPLE X

A mixture of 90 parts by weight of the liquid hydroxylated polybutadiene prepared in the manner described in Example IX and 10 parts by weight of powdered boric anhydride was heated for 2 hours at a temperature of 110° C. A hard, yellow, infusible solid material was formed. The product appeared to be insoluble in boiling water.

EXAMPLE XI

A mixture of 98 parts by weight of the hydroxylated liquid polybutadiene prepared in the manner described in Example IX and 2 parts by weight of powdered boric anhydride was heated for 3.5 hours at a temperature of 100° C. A rubbery material which was yellow in color was formed.

EXAMPLE XII

*Preparation of hydroxylated polybutadiene*

15 pounds of sodium catalyzed liquid polybutadiene having a viscosity of about 500 Saybolt Furol seconds, was dissolved in 120 pounds of chloroform and charged to a glass lined steel autoclave. 15.7 pounds of 20 per cent hydrogen peroxide and 4.26 pounds of formic acid were also charged.

After charging, the temperature of the reaction mixture was raised to 122° F. at atmospheric pressure and maintained at that level for about 14 hours. At the end of this reaction period, 5 gallons of water were added and the chloroform-hydroxy polybutadiene solution was recovered by decantation, after which the chloroform was stripped by vacuum distillation.

The product had a carbon content of 80.5 per cent by weight, a hydrogen content of 10.6 per cent by weight and an oxygen content of 8.9 per cent by weight.

The following runs demonstrate that the hydroxylated polymer is changed by treatment with $B_2O_3$, but that the change is not due to a reaction between, or an addition product of, the polymer and the boric anhydride.

EXAMPLE XIII

Using the liquid hydroxy polybutadiene of Example XII, a run was made in which 40.37 grams of the polymer, and 2.1 grams of boric anhydride were mixed and heated in an oven at 110° C. for 4 hours. This corresponds to approximately 5 per cent boric anhydride. The product was a soft, light yellow, rubbery material. This rubbery material was placed in 200 ml. of chloroform and allowed to stand overnight. The material was only slightly soluble but was dispersed in small particles. Then the chloroform dispersion was heated to boiling and poured into 800 ml. of hot water, the resulting mixture being boiled for 20 minutes to remove the chloroform. The product was reduced to small particle size and the chloroform treatment in boiling water repeated three times to remove all the boric anhydride after which the product was dried under vacuum at room temperature for 24 hours. This product was a soft material which was somewhat sticky.

EXAMPLE XIV 48.84 grams of the hydroxypolybutadiene of Example XII and 5.43 grams of boric anhydride, this being 10 percent by weight boric anhydride, were mixed and heated at 110° for 4 hours. The product after this treatment was a hard, rubbery material that crumbles when broken, being somewhat similar to rubber crumb. It had a light yellow color.

The boric anhydride was removed as described in Example XIII and the product, after this removal was hard and but slightly rubbery. Boron analysis of the final product showed less than 0.1 per cent boron.

EXAMPLE XV

A mixture of 38.66 grams of hydroxy polybutadiene and 6.84 grams of boric anhydride (15 per cent) were heated in an oven at 110° C. for 4 hours. The product was a light yellow resinous material. After removal of the boric anhydride the physical properties remained the same, this last material being very hard and crumbly.

The products of Examples XIV and XV do not melt, but can be molded using temperatures of 400° F. and higher and pressures of approximately 3,000 p. s. i. g. The molded products are reddish brown in color, somewhat transparent, and fairly brittle. Boron analysis of the final product showed less than 0.1 per cent boron.

EXAMPLE XVI

As a control for Examples XIII, XIV, and XV, a run was made in which 36.69 grams of hydroxypolybutadiene was heated for 4 hours at 110° C. in the absence of any boric anhydride. This product showed no change, the material being a light yellow, sticky liquid both before and after heating.

As many possible embodiments may be made of this invention without departing from the scope thereof, it is to be understood that all matter herein set forth is to be interpreted as illustrative and not in a limiting sense.

I claim:

1. The process of preparing a resin-like material from a compound selected from the group consisting of hydroxylated natural rubber hydroxylated polymers of conjugated dienes and hydroxylated copolymers of conjugated dienes with compounds copolymerizable therewith containing a vinylidene group, comprising mixing with said hydroxylated material boric anhydride in an amount of from 0.05 to 20 per cent by weight based upon the weight of said hydroxylated material, heating said mixture at a temperature of from 80 to 200° C. for a period of from 0.5 to 20 hours, and recovering the resulting product.

2. The process of preparing a resin-like material from a compound selected from the group consisting of hydroxylated natural rubber hydroxylated polymers of conjugated dienes and hydroxylated copolymers of conjugated dienes with compounds copolymerizable therewith containing a vinylidene group, comprising mixing with said hydroxylated material boric anhydride in an amount of from 1 to 15 per cent by weight based upon the weight of said hydroxylated material, heating said mixture at a temperature of from 90 to 150° C. for a period of from 1 to 6 hours, and recovering the resulting product.

3. The process of claim 2 in which said polymer is a liquid polymer.

4. The process of claim 2 in which said polymer is a solid polymer and said reaction is carried out by milling the polymer and the boric anhydride together.

5. The process of claim 2 in which said reaction is carried out in an inert solvent.

6. The process of treating liquid hydroxylated polybutadiene with boric anhydride comprising mixing with said polymer boric anhydride in an amount of from 0.05 to 20 per cent by weight based upon the weight of said polymer, heating said mixture at 80 to 200° C. for 0.5 to 20 hours, and recovering the resulting product.

7. The process of treating liquid hydroxylated polybutadiene with boric anhydride comprising mixing with said polymer boric anhydride in an amount of from 1 to 15 per cent by weight based upon the weight of said polymer, heating said mixture at 90 to 150° C. for 1 to 6 hours, and recovering the resulting product.

8. The process of preparing a resin-like material from a compound selected from the group consisting of hydroxylated natural rubber, hydroxylated polymers of conjugated dienes and hydroxylated copolymers of conjugated dienes with compounds copolymerizable therewith containing a vinylidene group, comprising mixing with said hydroxylated material boric anhydride in an amount of from 0.05 to 20 per cent by weight based upon the weight of said hydroxylated material, heating said mixture at a temperature from 80 to 200° C. for a period of from 0.5 to 20 hours, removing the boric anhydride from the mixture, and recovering the resulting product.

9. The process of claim 8 in which said boric anhydride is removed by dispersing the previously treated hydroxylated material in an organic solvent, contacting the resulting solution with water to remove the boric anhydride, and recovering the resulting product.

10. The process of claim 9 in which said organic solvent is chloroform.

11. The process of claim 10 in which the hydroxylated material is liquid hydroxypolybutadiene.

12. The product produced by the process of claim 1.

13. The process of preparing a resin-like material from a compound selected from the group consisting of hydroxylated natural rubber, hydroxylated polymers of conjugated dienes and hydroxylated copolymers of conjugated dienes with compounds copolymerizable therewith containing a vinylidene group comprising mixing with hydroxylated material boric anhydride in an amount of at least 0.05 per cent by weight based upon the weight of said hydroxylated material, heating said mixture at an elevated temperature for at least 0.5 hours, and recovering the resulting product.

14. The product produced by the process of claim 13.

No references cited.